United States Patent [19]

Allgeier

[11] 4,129,372
[45] Dec. 12, 1978

[54] LIGHT MIXING APPARATUS AND PHOTOGRAPHIC ENLARGER EMBODYING SAME

[75] Inventor: Michael Allgeier, Torrance, Calif.

[73] Assignee: Vivitar Corporation, Santa Monica, Calif.

[21] Appl. No.: 773,492

[22] Filed: Mar. 2, 1977

Related U.S. Application Data

[63] Continuation-in-part of Ser. No. 715,154, Aug. 17, 1976, abandoned.

[51] Int. Cl.² .................. G03B 27/00; G03B 27/76; G02B 5/14
[52] U.S. Cl. ..................... 355/1; 350/96.10; 355/35; 355/71
[58] Field of Search .......... 240/2, 13; 355/1, 32, 355/35, 38, 67, 68, 71, 77; 350/96 R, 96 T, 96 GN, 96 LM

[56] References Cited

U.S. PATENT DOCUMENTS

| 247,229 | 9/1881 | Wheeler | 350/96 R UX |
| 1,351,562 | 8/1920 | Foster | 350/96 R X |
| 1,633,228 | 6/1927 | Rogers | 355/67 |
| 1,880,414 | 10/1932 | Capstaff | 350/96 R X |
| 2,186,143 | 1/1940 | Neugass | 350/96 R X |
| 3,273,451 | 9/1966 | Wilson | 355/35 X |
| 3,469,914 | 9/1969 | Thomson | 355/32 |
| 3,756,712 | 9/1973 | Weisglass et al. | 355/71 |
| 3,817,617 | 6/1974 | Weinert | 355/71 |
| 3,831,021 | 8/1974 | Muhlogger | 350/96 T X |
| 4,023,903 | 5/1977 | Scheib | 355/71 |

FOREIGN PATENT DOCUMENTS

74054 11/1944 Czechoslovakia ................ 355/71

*Primary Examiner*—Donald A. Griffin
*Attorney, Agent, or Firm*—DeLio and Montgomery

[57] ABSTRACT

Apparatus for mixing light wherein the various color components are efficiently mixed to a uniform distribution. Light is introduced into one end of an optically clear rod-like member through a diffuser and is mixed therein through internal reflection.

36 Claims, 8 Drawing Figures

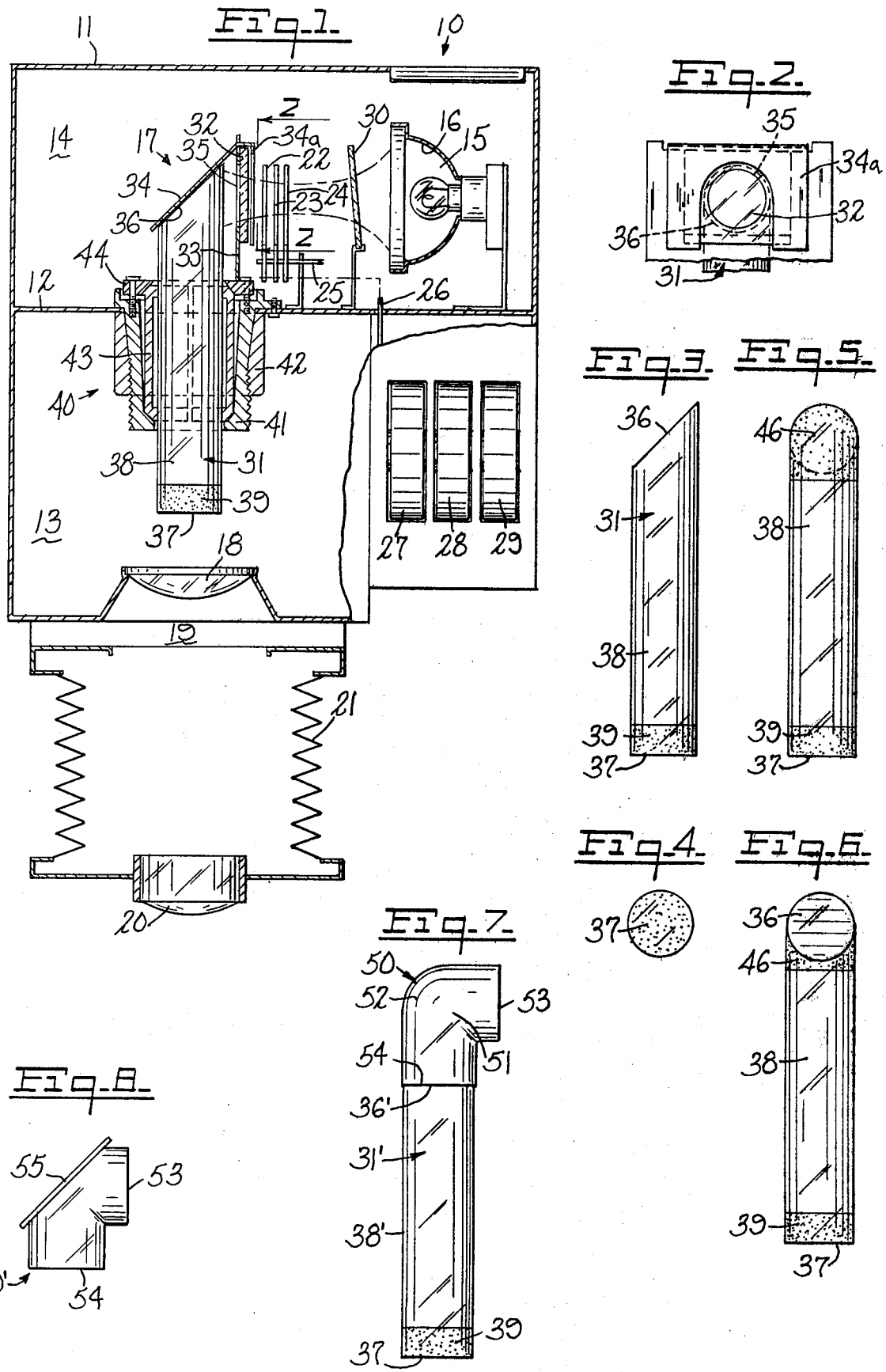

LIGHT MIXING APPARATUS AND PHOTOGRAPHIC ENLARGER EMBODYING SAME

This application is a continuation-in-part of application Ser. No. 715,154 filed Aug. 17, 1976, and now abandoned.

This invention relates generally to the field of light mixing systems and more specifically to apparatus for providing light having a uniform distribution of intensity and color over a pre-selected area.

Such light mixing systems are generally used in photographic enlargers, where it is desirable to provide light having an optimum intensity over the entire printing area while maintaining a uniform distribution of the intensity and color of the light to obtain sharp enlargements in a minimum exposure time. Preferred exposure times are generally on the order of less than 15 seconds.

Modern color enlargement systems heretofore have comprised a tungsten halogen lamp having an integral heat transmitting reflector, a plurality of dichroic filters individually variably movable into the light path to permit color corrections required for the variable color sensitivities of the various photographic print papers and chemicals used therewith, a hollow reflective chamber to mix the light and diffusers to provide a uniform intensity and color distribution. Such enlargers may also be used, generally without the filters, to provide black-and-white prints and enlargements.

In the described enlargers only about ten percent of the power supplied to the lamp is available as light, the remainder being dissipated as heat and other losses. The efficiency of the optics between the lamp and the printing paper is generally less than 1 percent. Therefore, in order to produce acceptable prints in the desired exposure time, a lamp having a high light output and a similarly high wattage is required.

Such a high wattage lamp, however, requires a cooling apparatus such as a forced air cooling system to dissipate the heat generated by the lamp. This adds to the expense of the enlarger, requires an enlarger of an increased size, and may result in the production of unsharp images due to the vibration introduced by the cooling system. It is therefore desirable to provide an optical system, and particularly a light mixing system, of increased efficiency. In the co-pending U.S. patent application entitled "Light Mixing Apparatus", Ser. No. 709,459, filed July 28, 1976 by R. Altman and R. Badkar, and assigned to the assignee of the present invention, a light mixing device is disclosed that efficiently and uniformly mixes light; however, it requires the use of several lengths of optically clear pipe fitted together to provide a plurality of surfaces to allow for more reflections within the optical system and increasing uniformity of the mixing.

The herein-disclosed invention provides a light mixing system of similarly high efficiency capable of producing uniform intensity and color distribution with a much shorter length of pipe.

Briefly stated, the invention in one form comprises a substantially rod-like elongated light transmitting member through which light is transmitted and mixed by internal reflection off its peripheral walls. Light is directed into the member at one end from a direction transverse to the axis thereof and is reflected from an angled end surface and reflector generally axially through the member. The member has a light diffusing surface at the light exit end and in a region of the peripheral wall contiguous thereto. Light diffusing means is provided between the lamp and the light entrance end of the light pipe to randomly diffuse and scatter the light from the lamp before it enters the light pipe, to increase the number of internal reflections of the light off the peripheral wall as it travels through the member.

Other embodiments are disclosed wherein the light is directed to intersect the rod-like member's longitudinal axis outside the member. The apparatus may further include an elbow for receiving the light, curving it and directing it generally axially toward and longitudinally through the rod-like member.

An object of the invention is to provide an improved light mixing apparatus.

Another object of the invention is to provide a light mixing apparatus for photographic enlargers having increased efficiency and improved uniformity of light intensity and color distribution.

Yet another object of this invention is to provide a photographic enlarger having a new and improved light mixing system.

The features of the invention which are believed to be novel are particularly pointed out and distinctly claimed in the concluding portion of this specification. However, the invention both as to its origin and operation, together with further objects and advantages thereof, may best be appreciated by reference to the following detailed description taken in conjunction with the drawings, in which:

FIG. 1 is a front elevational view partially cut away of a photographic enlarger head incorporating a light mixing apparatus embodying the invention;

FIG. 2 is a view along section lines 2—2 of FIG. 1;

FIG. 3 is an elevational view of a light mixing member embodying the invention;

FIG. 4 is an end view of the light mixing member of FIG. 3;

FIG. 5 is a view of a modification of the device shown in FIG. 3 as shown from the right thereof;

FIG. 6 is a view of the device as shown in FIG. 4 as seen from the opposite side thereof;

FIG. 7 is a side elevational view of a second embodiment of the invention having a straight light pipe and an elbow member for curving the light and directing it thereto; and FIG. 8 is a side elevational view of a modification of the elbow member shown in FIG. 7.

An enlarger 10 embodying the invention as shown in FIG. 1, includes a housing 11 having a mounting plate 12 which divides the head into a forward portion 13 and a rear portion 14. Rear portion 14 houses a lamp 15 having a reflecting surface 16 which serves to direct and focus the light towards a light mixing system 17. The forward portion 13 of housing 11 includes lower portion of light mixing device 17, a condensing lens 18 which directs light from the light mixing apparatus 17 toward a film slide 19 and a focusing lens 20 at the forwardmost end of adjustable bellows 21.

If the enlarger 10 is of the type for making color reproductions, a plurality of dichroic filters 22, 23 and 24 are mounted between lamp 15 and mixing system 17. The filters are individually pivotal about axis 25, movable into or out of the light path by conventional linkages indicated at 26 by means of operator-controlled dials 27, 28 and 29. Calibrated adjustments are provided to permit the operator to dial in a given amount of correction of the selected color(s). A heat mirror 30 is situated between the dichroic filters in lamp 15 to reflect infrared light generated by the lamp while permitting visible light to pass therethrough, thereby deflecting a substantial amount of heat generated by lamp 15. The heat mirror is angled with respect to the incident light so as to direct the heat away from lamp 15 and not cause it to become unduly warm.

In accordance with the invention, a new and improved light mixer 17 is disposed between the filters and condenser 18. The light mixer includes a rod-like member 31 of an optically clear material having a circular cross-section, a light diffusing element 32 supported by bracket 33 between member 31 in the filters for diffusing light from lamp 15 before it enters member 31, and a reflector 34, also supported on portion 34a by bracket 33. Bracket 33 has an aperture 35 which allows light to pass therethrough while blocking stray light which might enter member 31 without passing through the filters. Portion 34a is cut out about aperture 35.

As shown in FIGS. 1 and 3, member 31 has an upper surface 36 angled with respect to the axis of member 31, a lower exit surface 37 which is ground to diffuse light transmitted from element 31, and a peripheral wall 38 which is smooth except for a ground annular diffusing portion 39 contiguous to lower surface 37. Lower surface 37 is ground to diffuse light exiting therefrom and provide final mixing. The intensity of the light emitted from surface 37 is non-Lambertian. Accordingly, annular portion 39 is made diffusing so that light internally incident on this portion will be refracted through the peripheral wall and mitigate the non-Lambertian properties of surface 37. Member 31 has sufficient length to permit several internal reflections to provide for adequate mixing. A minimum length to diameter ratio of approximately three and one-half to one appears to be necessary for a sufficient number of reflections to achieve adequate mixing. The mixing efficiency of member 31 shows no great increase with increasing length as the length to diameter ratio increases beyond six to one. A length to diameter ratio of approximately five to one appears to be best, considering the optimum amount of mixing desired and space considerations.

With reference to FIG. 1, reflector 34 overlays top surface 36. Reflector 34 has a highly reflective surface, and is opaque but it is not critical that it be flat. Reflector 34 and top surface 36 cooperate to reflect light from aperture 35 generally axially through member 31. Any light exiting surface 36 is reflected into member 31 by reflector 34.

Member 31 is mounted through plate 12 by bracket 40 which includes a hub 41 inserted from rear portion 14 of housing 11 and is fixed to mounting plate 12 by nut 42. A split slip ring 43 rests in the well of hub 41 and compressively engages member 31 at two annular areas of contact. The annular areas are maintained relatively small to minimize generation of heat thereat. Retaining ring 44 holds slip ring 43 in the well tight against member 31. Member 31 is thus vertically adjustable for alignment purposes.

The optical axis of the enlarger extends from the center of the lamp, the center of aperture 35 in bracket 33, the center of surface 36, the axis of member 31, and the center lines of condenser 18 and lens 20.

A modification of member 31 is shown in FIGS. 5 and 6. The light entrance portion 46 of peripheral wall 38 near the top of member 31 is ground to diffuse the entering light from lamp 15 and the filters. In this configuration, diffusing plate 32 is not necessary. In the ground region 46, the entire circumference of peripheral wall 38 is ground as a manufacturing expediency, although only the light facing portion need be ground.

In operation, visible light from lamp 15 passes through heat mirror 30, along the optical axis defined above. Heat mirror 30 reflects the infrared light and heat away from mixer 17. The visible light passes through filters 22, 23 or 24 as may be placed in its path by the operator. The light then passes through the aperture in bracket 33, through diffuser 32, and enters the light entrance portion 46 of member 31. The diffused light is reflected from surface 36 and reflector 34 and is directed thereby generally axially through member 31. The light is efficiently mixed by internal reflections off peripheral wall 38. The light is then refracted from member 31 at its lower surface 37 and through the contiguous diffusion portion 39 of peripheral wall 38.

The member 31 may be of any suitable optically clear material which will withstand the heat from lamp 15. Examples of such material are glass, methylmethacrylate and polycarbonate. The surface 36 is preferably 45° with respect to the axis of member 31 for manufacturing and alignment purposes. However, other angles may be chosen and be within the scope of the invention.

In a typical embodiment of the invention, the lamp is positioned to focus on the middle filter, which is yellow, the others being cyan and magenta. The member 31 is five inches long overall, and one inch in diameter. End surface 37 and contiguous wall 39 are made diffusing by sandblasting with one hundred mesh grit. The diffusing member 32 need have only one diffusing surface, preferably on the side towards member 31. The length of diffusing wall portion 39 is one-half inch. The hot mirror 30 may be of commercial grade Pyrex glass.

In another embodiment of the invention the portion of the member 31 just below the angle surface 36 may be cut square. The light passing diffuser 32 is then reflected from reflector 34 into a square cut first end of member 31.

With reference to FIG. 7, a second embodiment of the invention includes a light pipe 31' of an optically clear material. Light pipe 31' has a top surface 36' cut square and perpendicular to the length direction of the light pipe. Light pipe 31' further has peripheral walls 38', a diffusing lower end 37 and a diffusing annular region 39. The embodiment further includes a hollow housihg member such as a tubular elbow member 50 which includes a curved body or shank portion 51, an exterior peripheral wall 52 and an interior peripheral wall. Elbow 50 has a first open end 53 facing lamp 15 and a second open end 54 proximate to, and preferably surrounding, uper end surface 36'. Light from lamp 15 enters the elbow 50 through first open end 53, is reflected off the interior peripheral wall and is directed toward entrance end 36' of light pipe 31' in a direction generally axially toward light pipe 31'. The reflection of the light off the interior peripheral wall also provides a preliminary mixing of the light before it enters light pipe 31'. Interior peripheral wall is preferably aluminized or painted white to enhance the reflection of the light therefrom. The elbow 50 as well as modified elbow 50' of FIG. 8 may be a conventional polyvinyl chloride pipe fitting.

Diffusing plate 32 may be used with this embodiment. However, plate 32 need not be provided if end 36' is made sufficiently diffusing by, for example, blasting end 36' with 100 mesh grit.

With reference to FIG. 8, a modified elbow 50' is provided with a flat reflecting mirror 55 disposed at a 45° angle to both end 53 and end 54. Reflector 55 is situated so as to reflect light from end 53 through end 54 to the light pipe. The interior peripheral wall, except reflector 55, is preferably aluminized or painted white to enhance the light reflective properties thereof. A diffusing plate 32 is also preferably used in conjunction with and ahead of modified elbow 50'. The plate 32 may be deleted if the upper end of the light pipe is made diffusing.

It may be thus seen that the objects of the invention set forth as well as those made apparent from the foregoing description are efficiently attained. While preferred embodiments of the invention have been set forth for purposes of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A light mixing system comprising a solid rod-like member of an optically clear material having a longitudinal axis and smooth peripheral walls, a first end and a second end surface, said second end surface being diffusing, a light source adapted to direct light into said rod-like member through said first end and generally axially through said member wherein light is internally reflected by said smooth peripheral walls and mixed along the length of said surface, and exits through said diffusing second end surface, and means on said peripheral walls of said rod-like member adjacent said second end surface for refracting light therethrough so that the pattern of light on a given area below said second end surface approaches a Lambertian distribution.

2. A light mixing system as defined in claim 1, in which said rod like member has a circular cross-section orthogonal to said longitudinal axis.

3. The system of claim 2 wherein the length to diameter ratio of said rod-like member is at least three and one-half to one.

4. A light mixing system as defined in claim 1 wherein said light source is arranged to direct light transversely toward the longitudinal axis, and a reflector is positioned to reflect the directed light into said first end.

5. A light mixing system as defined in claim 1 wherein said first end is a surface situated at a 45° angle with respect to said longitudinal axis, and the light is directed through the peripheral wall to said surface.

6. A light mixing system as defined in claim 1 further comprising means for diffusing light directed toward said first surface from said light source.

7. A light mixing system as defined in claim 1 further comprising filter means disposed between said source and said first end surface for adjusting the color content of the light directed at said first end.

8. A light mixing system as defined in claim 1 further comprising means for deflecting a substantial portion of the heat from the light source away from said member.

9. A light mixing system as defined in claim 1 further comprising a condensing lens proximate said second end.

10. The light mixing system of claim 1 wherein said means on said peripheral wall comprises an annular light diffusing area.

11. A light mixing system comprising a solid rod-like member of an optically clear material having smooth peripheral walls, a longitudinal axis, a first end surface and a second end surface, said second end surface being diffusing; a light source adapted to direct light in a direction transverse to said longitudinal axis to intersect said axis, and reflecting means adapted to reflect light from said source at said first end surface and generally axially through said rod-like member wherein the light is internally reflected by said smooth peripheral walls and mixed along the length of said rod-like member and exits through said second end surface, and means on said peripheral walls of said rod-like member adjacent said second end surface for refracting light therethrough so that the pattern of light on a given area below said second end surface and said adjacent means approaches a Lambertian distribution.

12. A system as defined in claim 11 wherein said reflecting means comprises a hollow member having a first open end and a second open end in substantially perpendicular planes, said hollow member serving to receive light from said light source through said first open end, cause the light to change direction through reflection off the internal walls thereof, said light exiting said hollow member through said second open end.

13. A system as defined in claim 12 wherein said hollow member further includes a reflector to reflect light from said light source generally axially toward said rod-like member.

14. A system as defined in claim 11 wherein said first end surface is diffusing.

15. A light mixing system comprising a solid rod-like member of an optically clear material having smooth peripheral walls, a longitudinal axis, a first end surface and a second end surface; said second end surface being diffusing; a light source adapted to direct light in a direction transverse said longitudinal axis; a hollow member having a first open end facing said light source and a second open end receiving and surrounding said first end surface, a plurality of color filters movable into the light path between said source and said hollow member, said hollow member having a reflecting internal surface to reflect light from said source and direct the light generally axially through said rod-like member wherein the light is internally reflected by said smooth peripheral walls and mixed along the length of said rod-like member, the light exiting said rod-like member through said second end surface, said second end surface being light diffusing, and light diffusing means between said filters and said first end surface of said rod-like member, said rod having a length at least three and one-half times its diameter to provide sufficient internal reflection for adequate mixing of the light therein.

16. The light mixing system as defined in claim 15 wherein said means for diffusing the light is prior to said first open end of said hollow member.

17. The light mixing system of claim 15 wherein an annular diffusing portion defined on said rod-like member contiguous to said second end surface whereby light incident on said contiguous portion is refracted therethrough, said diffusing portion extending only a small portion of the length of said rod-like member, whereby the pattern of light on a given area below said second end surface approaches a Lambertian distribution.

18. A light mixing system comprising a rod-like member of an optically clear material, having a smooth peripheral wall, a longitudinal axis, a first end surface and a second end surface, said second end surface being diffusing, a light source, said light source arranged to direct light toward the longitudinal axis, a hollow member disposed over said first end surface of said rod-like member, said member including an interior surface adapted to reflect the light from said source and direct it at said first end surface and generally axially through said rod-like member whereby the directed light is mixed by internal reflection from said peripheral wall at points along the length of said rod-like member as the light travels along said rod-like member and exits through said second end surface, said rod-like member having a light diffusing second end surface and an annular diffusing area contiguous thereto for refracting light therethrough so that the pattern of light on a given area below said second end surface approaches a Lambertian distribution.

19. A photographic enlarger comprising a housing, a light source, color filters, and condenser in said housing, the filters being positioned between said light source and said condenser whereby said filters may be introduced into the path of light from said source, a light mixing device comprising a solid rod-like member of optically clear material having a smooth peripheral wall, a longitudinal axis, a first end surface and a second end surface, said second end surface being diffusing, said light source disposed to direct light toward the longitudinal axis, and a hollow member disposed over said first end surface, said member including a reflecting surface adapted to reflect light from said source and direct it at said first end surface generally axially through said rod-like member whereby the light is mixed by internal reflection from said peripheral wall at points along the length of said rod-like member, and exits through said second end surface, and said peripheral wall has a diffusing portion contiguous to said second end surface whereby light incident on said diffusing portion is refracted therethrough so that the pattern of light on a given area below said second end surface and said diffusing portion approaches a Lambertian distribution, said rod-like member having a length to diameter ratio of at least three and one-half to one, said condenser positioned to receive the light output at the second end of said mixing device.

20. A photographic enlarger comprising a housing member, a light source, and a light mixing device, said light mixing device comprising a solid rod-like member of optically clear material having a longitudinal axis and a smooth contiguous peripheral wall, a wall member separating said housing into upper and lower portions, said source disposed in said upper section and directed transverse to said axis, means for supporting said rod-like member through said wall member with an upper end in said upper housing portion and a lower end in said lower housing portion, light diffusing means between said source and said upper end, a hollow member disposed over said upper end, said hollow member having a reflecting inner surface to reflect light directed into the upper end of said rod-like member generally longitudinally of said axis whereby the light is mixed in said rod-like member by internal reflection from said peripheral wall, said means for supporting having only minimal contact with said rod-like member to minimize generation of heat at the contact, said lower end being light diffusing, said rod-like member having a length at least three and one-half times its diameter to provide sufficient mixing of light along the length thereof, and a condenser lens disposed below said lower end to receive the diffused light output of said rod-like member.

21. The enlarger of claim 20 wherein said rod-like member has an annular diffusing area on said peripheral wall contiguous said lower end whereby light incident on said contiguous portion is refracted therethrough, said contiguous diffusing portion extending from said lower end only a small portion of the length of said rod-like member whereby the pattern of light on a given area below said lower end approaches a Lambertian distribution.

22. The enlarger of claim 20 wherein said light diffusing means is provided by making the upper end of said rod-like member light diffusing.

23. The enlarger of claim 20 wherein said light diffusing means is an element positioned between said source and said upper end.

24. The enlarger defined in claim 20 further including a mask disposed in the light path between said filters and said rod-like member, said mask having a light-transmitting opening in the light path of lesser diameter than said member.

25. A photographic enlarger comprising a housing member, a light source, and a light mixing device, said light mixing device comprising a solid rod-like member of optically clear material having a longitudinal axis and a smooth peripheral wall, a wall member separating said housing into upper and lower portions, said source disposed in said upper section and directed transverse to said axis, means for supporting said rod-like member from said wall member with an upper end in said upper housing portion and a lower end in said lower housing portion, a hollow member disposed over said upper end, said hollow member having a reflector adapted to reflect light directed into the upper end of said rod-like member generally longitudinally of said axis whereby the light is mixed in said rod-like member by internal reflection from said smooth peripheral wall, color filters positionable between said source and said housing to vary the color content of the light directed to said rod-like member, means for diffusing the light between said filters and said rod-like member; said rod-like member having a diffusing area on said peripheral wall contiguous said second end whereby light incident on said contiguous portion is refracted therethrough, said diffusing portion extending from said second end only a small portion of the length of said rod-like member, said rod-like member having a diffusing second end, whereby the pattern of light on a given area below said second end approaches a Lambertion distribution, the length of said rod-like member being at least three and one-half times its diameter.

26. A photographic enlarger comprising a housing member, a wall member dividing said housing member into upper and lower portions, a light mixing device in the form of a solid rod-like member of optically clear material having a straight longitudinal axis and smooth peripheral walls, said rod-like member having first and second end surfaces, means supporting said rod-like member through said wall member with said first end surface in said upper portion and said second end surface in said lower portion, a light source in said upper portion, said source directing light into the first end of said rod-like member, first means for diffusing the light entering said first end, whereby the diffused light is internally reflected by said smooth peripheral wall as it travels generally axially of said rod-like member with resulting mixing, said rod-like member having an essentially constant diameter throughout its length and a length to diameter ratio of at least three and one-half to one to provide sufficient mixing by the internal reflections from said peripheral wall, said support means having minimal contact with said rod-like member to minimize generation of heat at the contact, a condenser lens disposed below said second end of said rod-like member to receive the light output therefrom and second means for diffusing light exiting said rod-like member and entering said condenser lens.

27. The enlarger of claim 26 where the light is directed substantially perpendicular to the longitudinal axis of said rod-like member, means for reflecting the light into said first end surface, and said first diffusing means is a diffusing element positioned between said source and said reflecting means.

28. The enlarger of claim 27 further including a hollow housing member disposed over said first end surface, said hollow member including said means for reflecting therein.

29. The enlarger of claim 28 wherein said means for reflecting is a mirror disposed at substantially 45° to said longitudinal axis.

30. The enlarger of claim 27 further comprising a plurality of color filters movable into the light path between said source and said diffusing element.

31. The enlarger of claim 26 where said first end surface is about 45° to said longitudinal axis and the light is directed through the peripheral wall of said rod-like member to said first end surface.

32. The enlarger of claim 31 further comprising a mask disposed between the light source and said rod-like member, said mask having a light transmitting opening of a smaller diameter than said rod-like member.

33. The enlarger of claim 26 further including means on said peripheral wall of said rod-like member adjacent said second end surface for refracting light therethrough so that the pattern of light on a given area below said second end surface approaches a Lambertian distribution.

34. The enlarger of claim 33 where said refracting means is an annular diffusing band defined on said peripheral wall contiguous said second end surface.

35. The enlarger of claim 26 further comprising a plurality of color filters movable into the light path between said source and said first means for diffusing.

36. The enlarger of claim 26 where the length to diameter ratio of said rod-like member is no greater than six to one.

* * * * *

UNITED STATES PATENT AND TRADEMARK OFFICE
CERTIFICATE OF CORRECTION

PATENT NO. : 4,129,372
DATED : December 12, 1978
INVENTOR(S) : Michael Allgeier

It is certified that error appears in the above-identified patent and that said Letters Patent are hereby corrected as shown below:

Column 2, line 10, after "elbow" insert --member--.

Column 4, line 46, "housihg" should read --housing--.

Column 4, line 51, "uper" should read --upper--.

Column 5, line 29, change "surface" to --member--.

Signed and Sealed this

Twelfth Day of June 1979

[SEAL]

Attest:

RUTH C. MASON
Attesting Officer

DONALD W. BANNER
Commissioner of Patents and Trademarks